United States Patent
Babu et al.

(10) Patent No.: US 10,009,733 B2
(45) Date of Patent: Jun. 26, 2018

(54) METHOD AND SYSTEM FOR DETERMINING A POSITION OF A MOBILE DEVICE BY AN ACCESS POINT

(71) Applicant: Samsung Electronics Co., Ltd., Suwon-si, Gyeonggi-do (KR)

(72) Inventors: Swarna Ravindra Babu, Bangalore (IN); Arun Kumar Siddanahalli Ninge Gowda, Bangalore (IN); Sameet Mangesh Deshpande, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 14/709,905

(22) Filed: May 12, 2015

(65) Prior Publication Data

US 2015/0334534 A1 Nov. 19, 2015

(30) Foreign Application Priority Data

May 13, 2014 (IN) ............................ 2388/CHE/2014
Dec. 4, 2014 (IN) ............................ 2388/CHE/2014

(51) Int. Cl.
*H04W 64/00* (2009.01)
*H04W 4/04* (2009.01)
*H04W 84/12* (2009.01)

(52) U.S. Cl.
CPC ............. *H04W 4/043* (2013.01); *H04W 4/04* (2013.01); *H04W 84/12* (2013.01)

(58) Field of Classification Search
CPC ....... H04W 64/003; H04W 4/02–4/04; H04W 84/12
See application file for complete search history.

(56) References Cited

U.S. PATENT DOCUMENTS

| | | | | |
|---|---|---|---|---|
| 2005/0003827 | A1* | 1/2005 | Whelan | H04W 16/10 455/454 |
| 2007/0178922 | A1* | 8/2007 | Yamada | H04W 24/00 455/513 |
| 2009/0088183 | A1* | 4/2009 | Piersol | G01C 21/206 455/456.1 |
| 2009/0131082 | A1* | 5/2009 | Gast | G01S 5/0205 455/457 |

(Continued)

*Primary Examiner* — Asad Nawaz
*Assistant Examiner* — Zhaohui Yang
(74) *Attorney, Agent, or Firm* — Jefferson IP Law, LLP

(57) ABSTRACT

A method and system for determining a position of a mobile device in an indoor environment by an access point is provided. The method includes obtaining identity information of the mobile device. The method includes extracting signal characteristics of the mobile device corresponding to the identity information. Further, the method includes determining the position of the mobile device based on the signal characteristics of the mobile device. The position of the mobile device is determined based on the signal characteristics of the mobile device received from a plurality of access points along with the information of the plurality of access points such as location information and identity information of the access points. The determined position is sent to the mobile device. The access point implements robust multipath mitigation algorithms while determining the position of the mobile device as there is no battery power limitation at the access point.

8 Claims, 3 Drawing Sheets

(56) References Cited

U.S. PATENT DOCUMENTS

| | | | |
|---|---|---|---|
| 2011/0285591 A1* | 11/2011 | Wong | G01S 5/0036 342/451 |
| 2012/0129546 A1* | 5/2012 | Yang | G01S 5/0252 455/456.1 |
| 2013/0257657 A1 | 10/2013 | Garin et al. | |
| 2013/0262223 A1 | 10/2013 | Catane et al. | |
| 2013/0308618 A1* | 11/2013 | Panneerselvam | G01S 5/0236 370/338 |
| 2014/0003310 A1* | 1/2014 | Kamath | G01S 1/20 370/311 |
| 2014/0016485 A1* | 1/2014 | Curticapean | G01S 5/12 370/252 |
| 2015/0219742 A1* | 8/2015 | Castagnoli | H04W 4/02 370/336 |

* cited by examiner

METHOD AND SYSTEM FOR DETERMINING A POSITION OF A MOBILE DEVICE BY AN ACCESS POINT

PRIORITY

This application claims the priority under 35 U.S.C. § 119(a) to Indian Provisional Patent Application Serial No. 2388/CHE/2014, which was filed in the Indian Intellectual Property Office on May 13, 2014, and Indian Complete Patent Application Serial No. 2388/CHE/2014, which was filed in the Indian Intellectual Property Office on Dec. 4, 2014, the entire contents of which are incorporated herein by reference.

FIELD OF INVENTION

The present invention relates to a Wireless Fidelity (Wi-Fi) positioning system and more particularly relates to a method and system for determining a position of a mobile device by an Access Point (AP).

BACKGROUND OF INVENTION

Currently position of mobile devices can be computed using satellite based Global Positioning System (GPS). A GPS receiver in the mobile device may be configured for obtaining positioning information related to the mobile device. Although successful, the GPS receiver may not provide accurate positioning information in case of signal blockages caused in tunnels, deep-urban areas, and foliages.

In case of indoor positioning, the GPS may not work as signals transmitted by the satellites associated with the GPS may get attenuated and scattered by roofs, walls, and other objects in an indoor environment. Therefore, a method of indoor positioning based on Wireless Fidelity (Wi-Fi) signals transmitted by wireless access points was developed.

A Wi-Fi based positioning system may use radio signals from an Access Point (AP) at the mobile device for computing position of the mobile device in the indoor environment. Examples of indoor environment can include office buildings, residential apartments, cinema halls, malls or the like. The mobile device can measure a Received Signal Strength Indicator (RSSI) from the plurality of AP's and perform a trilateration based calculation to compute its position. There are two approaches primarily used for the position computation. The first is a finger-printing approach, where the entire area of the indoor environment needs to be calibrated. It requires comparison of the RSSI data received from current measurements with pre-measured data collected at calibrated locations. Any change in the location of the AP in the indoor environment reduces the accuracy of the position calculation, and requires recalibration of the indoor environment.

The second is the propagation model based approach, where the distances to the APs are calculated based on the received signal strengths at the mobile device, which are subsequently used by trilateration algorithms to compute the position of the mobile device, which can be used to determine the position the user of the mobile device. The performance of both these approaches is strongly influenced by the environment. A change in the environment has an undue effect in determining the position of the mobile device. These approaches consume a lot of battery power due to the processing of position calculation algorithms and also undergo significant delays, in the order of 1 to 10 secs, to compute the position of the user. Further, for the location information of the APs, a database containing the MAC ID's and location data of the AP's is required at the mobile device. Moreover, scanning for the AP's incurs processing power and latencies.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a method and system for determining a position of a mobile device in an indoor environment by an Access Point (AP).

Accordingly the embodiments herein provide a method of determining a position of a mobile device by an Access Point (AP), the method includes obtaining identity information of the mobile device. Further, the method includes extracting signal characteristics of the mobile device corresponding to the identity information. Furthermore, the method includes determining the position of the mobile device based on the signal characteristics.

Accordingly the embodiments herein provide a Wireless Fidelity (Wi-Fi) Access Point (AP) for determining a position of a mobile device, wherein the AP comprises a controller module configured to obtain identity information of the mobile device. Further, the controller module is configured to extract signal characteristics of the mobile device corresponding to the identity information. Furthermore, the controller module is configured to determine the position of the mobile device based on the signal characteristics.

Accordingly the embodiments herein provide a computer program product comprising a computer executable program code recorded on a computer readable non-transitory storage medium, the computer executable program code when executed causing the actions including obtaining identity information of a mobile device. Further, the computer program code when executed causes the actions including extracting signal characteristics of the mobile device corresponding to the identity information. Further, the computer program code when executed causes the actions including determining a position of the mobile device based on the signal characteristics.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF THE PRESENT INVENTION

Figure 1:
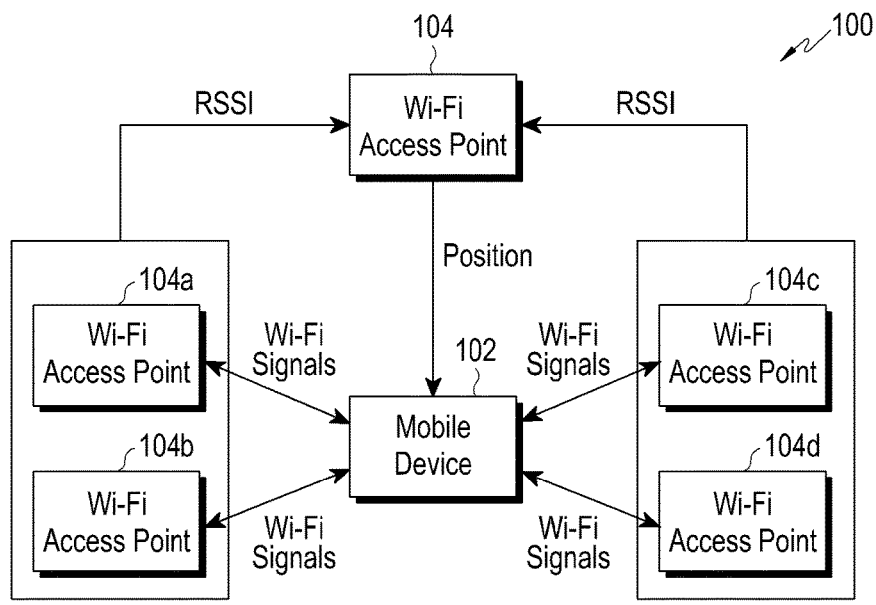
FIG. 1 illustrates a high level overview of a system for determining a position of a mobile device, according to embodiments as described herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method and system for determining a position of a mobile device in an indoor environment by a Wireless-Fidelity (Wi-Fi) Access Point (AP). The method includes obtaining identity information of the mobile device. In an embodiment, the identity information includes a Medium Access Controller (MAC) Identifier (ID) of the mobile device. The method includes extracting signal characteristics of the mobile device corresponding to the identity information. An example of a signal characteristic of the mobile device is the Received Signal Strength Indication (RSSI). In an embodiment, the signal characteristics extracted are dependent on the distance between the AP and the mobile device. Further, the method includes determining the position of the mobile device based on the signal characteristics of the mobile device received from plurality of AP's.

In an embodiment, the position of the mobile device can be determined based on the signal characteristics of the mobile device received from a plurality of APs along with the information of the plurality of APs such as position information and the identity information of the APs, which include Wi-Fi MAC ID and a Wireless Local Area Network (WLAN) ID. The AP runs one or more multipath mitigation algorithms to reduce the multipath effects, and then uses a Bayesian Propagation Model for determining the position of the mobile device.

The determined position is sent to the mobile device through any suitable communication medium such as Bluetooth, Wi-Fi and so on.

Unlike the conventional system, the proposed method and system provides a mechanism for determining the position of the mobile device by the AP. As the mobile device position is computed at the AP, and sent back to the mobile device, there is virtually no processing involved in the mobile device. The system provides a significant advantage in terms of battery power observed at the mobile device. Further, with the proposed method and system, the location information of the APs is not required at the mobile device. The MAC ID of the mobile device and the RSSI information of the mobile device corresponding to the MAC ID as seen by the AP's are the only information that the APs obtain from the mobile device. The proposed system and method reduces latency in computing the position of the mobile device as the database at a master AP contains the MAC IDs and location information of all the participating APs. The master AP can be any one of the APs in the system configured to compute the position of the mobile device. Further, using the proposed system and method the user position accuracy can also be enhanced as sophisticated multipath algorithms can be implemented at APs. Further, the sophisticated multipath mitigation algorithms can minimize the multipath effects caused by the surrounding environment for determining the position of the mobile device.

Referring now to the drawings and more particularly to FIGS. 1 through 6 where similar reference characters denote corresponding features consistently throughout the figures, there are shown preferred embodiments.

FIG. 1 illustrates a high level overview of a system 100 for determining position of a mobile device, according to embodiments as described herein. As depicted in the FIG. 1, the system 100 comprises a mobile device 102, a plurality of Wi-Fi APs 104, 104a, 104b, 104c and 104d. Among the plurality of AP's 104 and 104a-104d, any of the AP can be considered as a master AP for determining the position of the mobile device 102. The AP 104 is considered as the master AP for determining the position of the mobile device 102 as shown in FIG. 1.

The mobile device 102 can wirelessly communicate with the plurality of the APs 104 and 104a-104d. The APs 104a-104d can be configured to transmit Wi-Fi signals to the mobile device 102. In an embodiment, the mobile device 102 is positioned to receive transmissions from and/or communicate with any of the APs as shown in the FIG. 1. The mobile device 102 can be any suitable Wi-Fi-enabled device including, can be for example, but is not limited to, a cell phone, a personal digital assistant, a mobile personal computer, a laptop, a tablet, a phablet, a desktop computer, a communicator, or an equivalent thereof.

The plurality of APs 104 and 104a-104d can communicate with the mobile device 102 using various communication protocols. The APs 104a-104d can be configured to obtain the identity information of the mobile device 102. The identity information includes the MAC ID of the mobile device 102. In an embodiment, the plurality of APs 104a-104d obtains the identity information of the mobile device 102 in a probe request from the mobile device 102. The APs 104a-104d extracts signal characteristics of the mobile device 102 corresponding to the identity information. The signal characteristics of the mobile device 102 include the RSSI. The signal characteristics, RSSI, of the mobile device 102 may vary depending on the position of the mobile device 102 from the APs 104a-104d.

In an embodiment, the signal characteristics of the mobile device 102 are dependent on the distance between the AP and the mobile device 102. In an example, the RSSI of the mobile device 102 is high, when the mobile device 102 is closer to the AP and the RSSI of the mobile device 102 is low, when the mobile device 102 is farther from the AP.

When the signal characteristics of the mobile device 102 are extracted at each of the APs 104a-104d, the signal characteristics of the mobile device 102 are sent to the AP 104. In an example, consider that the signal characteristic of the mobile device 102 from the AP 104a is RSSI 1. Similarly, consider the signal characteristics of the mobile device 102 from the AP 104b is RSSI 2, the signal characteristics of the mobile device 102 from the AP 104c is RSSI 3 and the signal characteristics of the mobile device 102 from the AP 104d is RSSI 4. In the above example, the signal characteristics of the mobile device 102 (RSSI 1, RSSI 2, RSSI 3 and RSSI 4, with respect to the APs 104a-104d) are sent to the AP 104 (configured as the master AP) for determining the position of the mobile device 102. In an embodiment, the information of each of the AP along with the signal characteristics of the mobile device 102 at each of the AP is sent to the AP 104, which is configured as the master AP. The information of each of the AP 104a-104d includes location information of the AP and the identity information of the AP, which denotes the Wi-Fi MAC ID and the WLAN ID of the AP.

In an embodiment, the AP 104 (which is considered as the master AP) maintains a database which includes the position coordinates of the APs 104a-104d along with the MAC IDs of APs 104a-104d.

The AP 104 determines the position of the mobile device 102 based on the signal characteristics of the mobile device 102 obtained from the APs 104a-104d and the information of the APs 104a-104d.

In an embodiment, the AP 104 uses a trilateration based calculation for determining the position of the mobile device 102. In an embodiment, the AP 104 runs one or more multipath mitigation algorithms to reduce multipath effects. The AP 104 can use Bayesian Propagation Model for determining the position of the mobile device 102.

The AP 104 sends the determined position of the mobile device 102 to the mobile device 102 through any suitable communication medium such as Bluetooth, Wi-Fi and so on.

Although FIG. 1 describes the system 100 with one mobile device 102, it must be understood that the embodiments described herein are not limited to one mobile device 102.

Figure 2:
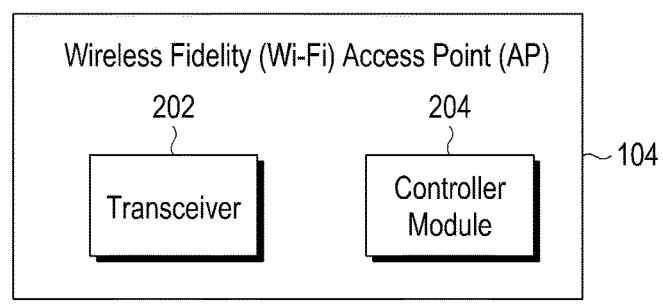
FIG. 2 illustrates a block diagram of a Wireless-Fidelity (Wi-Fi) Access Point (AP) with various modules, according to the embodiments as described herein.

FIG. 2 illustrates a block diagram of the Wi-Fi AP 104 with various modules, according to the embodiments as described herein. The Wi-Fi AP 104 includes a transceiver 202 and a controller module 204. The transceiver 204 can be configured to provide an interface through which the AP 104 accesses the wireless medium to communicate with one or more of the mobile devices or with the plurality of APs 104a-104d.

The controller module 204 can instruct the transceiver 202 to transmit the probe responses, data packets, and beacons to the mobile device 102. The probe responses are transmitted in response to the probe request transmitted by the mobile device 102.

In an embodiment, the controller module 204 can be configured to obtain the identity information from the mobile device 102 and extract the signal characteristics of the mobile device 102 corresponding to the identity information. Further, the controller module 204 can be configured to determine the position of the mobile device 102 based on the signal characteristics of the mobile device 102.

In an embodiment, the controller module 204 can be configured to receive the signal characteristics (such as the RSSI) of the mobile device 102 from the plurality of APs 104a-104d. In an embodiment, the controller module 204 can be configured to receive the location information and the MAC IDs of the plurality of APs 104a-104d for determining the position of the mobile device 102.

The controller module 204 uses one or more multipath algorithms to reduce multipath effects while determining the position of the mobile device 102. Further, the controller module 204 uses the Bayesian propagation model for determining the position of the mobile device 102.

In an embodiment, the AP 104 can maintain the database that includes the location information and the identity information (the Wi-Fi MAC IDs) of the plurality of APs 104a-104d.

Figure 3:
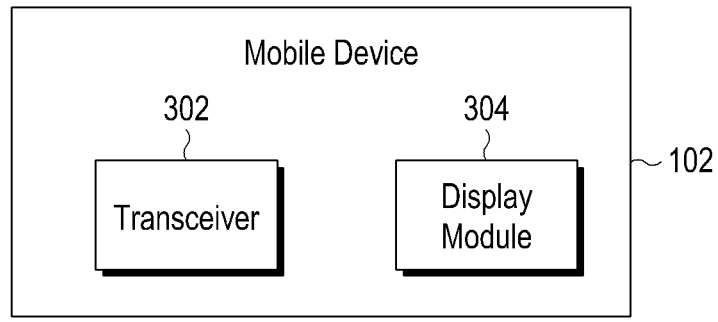
FIG. 3 illustrates a block diagram of the mobile device with various modules, according to the embodiments as described herein.

FIG. 3 illustrates a block diagram of the mobile device 102 with various modules, according to the embodiments as described herein. The mobile device 102 includes a transceiver 302, and a display module 304. The transceiver 302 in the mobile device 102 can be configured to provide an interface through which the mobile device 102 accesses the wireless medium to communicate with the plurality of APs 104 and 104a-104d. The transceiver 302 can be configured to receive beacons and other data packets from the APs 104a-104d and transmit the probe requests to the plurality of APs 104 and 104a-104d. The transceiver 302 can be configured to receive the probe responses from the plurality of APs 104 and 104a-104d.

In an embodiment, the transceiver 302 can be configured to transmit the probe request along with the identity information that includes the MAC ID of the mobile device 102.

The display module 304 displays the position of the mobile device 102 on a user interface of the mobile device 102. The position of the mobile device 102 can be displayed continuously on the user interface of the mobile device 102 along the trajectory of the mobile device 102. In an example, the display module 304 provides the position coordinates (x, y) of the mobile device 102.

Figure 4:
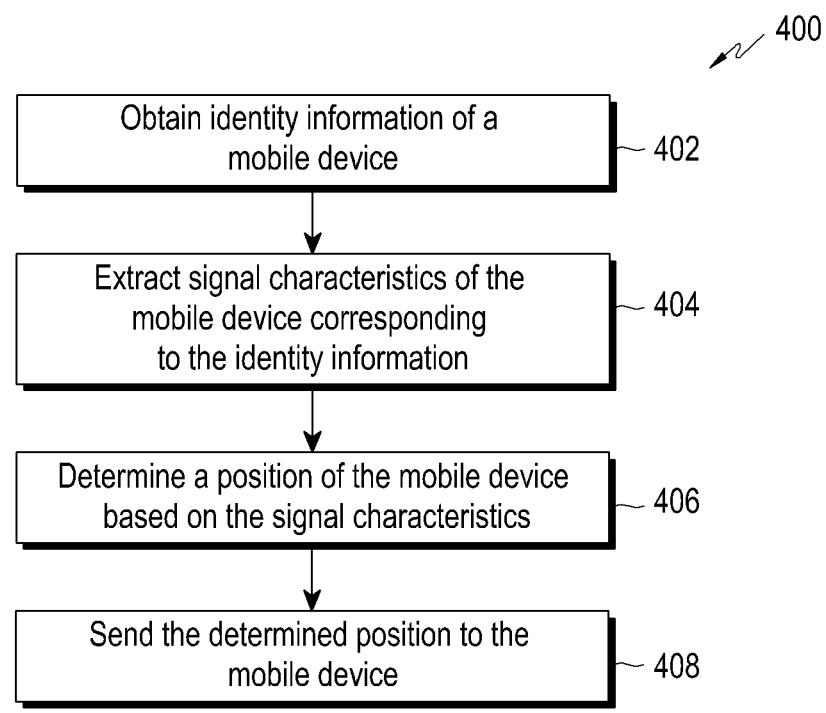
FIG. 4 is a flow diagram explaining a method for determining the position of the mobile device by the AP, according to the embodiments as described herein.

FIG. 4 is a flow diagram explaining a method 400 for determining the position of the mobile device by the AP, according to the embodiments as described herein.

The various steps of the method 400 are summarized into individual blocks where some of the steps are performed by the AP 104, the AP's 104a-104d, the mobile device 102, and a combination thereof. The method 400 and other description described herein provide a basis for a control program, which can be implemented using a microcontroller, microprocessor, or any computer readable storage medium.

At step 402, the method 400 includes obtaining identity information of the mobile device 102. The method 400 allows the controller module 204 to obtain the identity information of the mobile device 102. The identity information includes the MAC ID of the mobile device 102. In an embodiment, the identity information of the mobile device 102 can be sent in the probe request from the mobile device 102.

At step 404, the method 400 includes extracting the signal characteristics of the mobile device 102 corresponding to the identity information. The method 400 allows the controller module 204 to extract signal characteristics of the mobile device corresponding to the identity information. The signal characteristic of the mobile device 102 includes the RSSI. The signal characteristics of the mobile device 102 may vary depending on the position of the mobile device 102 from the plurality of APs 104a-104d.

In an embodiment, the signal characteristics of the mobile device 102 depend on the distance between the APs 104a, 104b, 104c, 104d and the mobile device 102.

For example, the signal characteristics of the mobile device 102 are received from the plurality of APs 104a-104d. The method 400 allows controller module 204 to receive the signal characteristics of the mobile device 102 from the plurality of APs 104a-104d. In an example, the signal characteristics of the mobile device 102 at each of the APs (104a, 104b, 104c and 104d) such as RSSI 1, RSSI 2, RSSI 3 and RSSI 4 are received at the AP 104 from the APs 104a, 104b, 104c and 104d respectively.

In an embodiment, the information associated with the plurality of the APs 104a-104d can be received from the plurality of APs 104a-104d. The information associated with the plurality of APs 104a-104d can include the location information and the identity information (the MAC ID) of the APs 104a-104d.

In an embodiment, the AP 104 maintains a database which includes the location of the APs 104a-104d along with the MAC IDs of the APs 104a-104d.

At step 406, the method 400 includes determining the position of the mobile device 102 based on the signal characteristics of the mobile device 102. The method 400 allows the controller module 204 to determine the position of the mobile device 102 based on the signal characteristics of the mobile device 102. In an embodiment, the AP 104 determines the position of the mobile device 102 based on the signal characteristics of the mobile device 102 received from the plurality of APs 104a-104d and the information associated with the plurality of APs 104a-104d. The AP 104 uses the trilateration based calculation for determining the position of the mobile device 102. In an embodiment, the AP 104 runs one or more multipath mitigation algorithms to reduce multipath effects. The AP 104 can use the Bayesian Propagation Model for determining the position of the mobile device 102.

At step 408, the method 400 includes sending determined position to the mobile device 102. The method 400 allows the controller module 204 to send the determined position to the mobile device 102. In an embodiment, the determined position can be sent to the mobile device 102 through any suitable communication medium such as Bluetooth, Wi-Fi and so on.

Further, the various actions, units, steps, blocks, or acts described in the method 400 can be performed in the order presented, in a different order, simultaneously, or a combination thereof. Furthermore, in some embodiments, some of the actions, units, steps, blocks, or acts listed in the FIG. 4 may be omitted.

Figure 5:
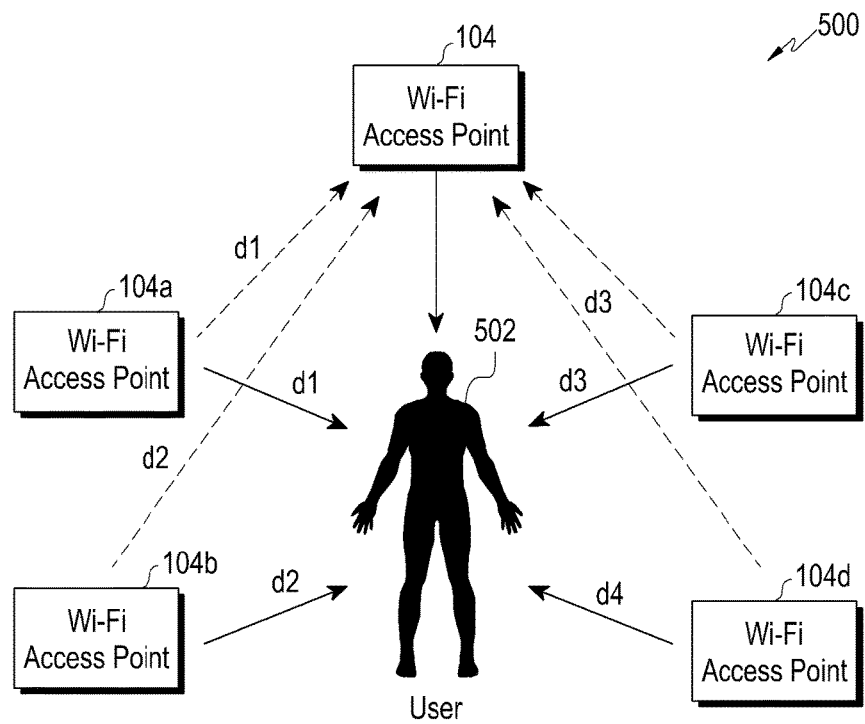
FIG. 5 illustrates an example scenario of determining position of a user based on signals from a plurality of APs, according to the embodiments as described herein.

FIG. 5 illustrates an example scenario of determining position of a user based on signals from a plurality of APs, according to the embodiments as described herein. In the scenario, shown in FIG. 5, when the user 502 triggers an indoor positioning application on the mobile device 102, the MAC ID of the mobile device 102 is sent to the plurality of APs 104a-104d. Among the plurality of APs, the AP 104 is considered as the master AP. The plurality of APs 104a-104d receives the MAC ID of the mobile device 102 and extracts the signal characteristics (such as RSSI) of the mobile device 102 corresponding to the identity information. The distance from the mobile device 102 to each AP 104a-104d can be computed using the signal characteristics of the mobile device 102 as sensed by each AP 104a-104d. The signal characteristics of the mobile device 102 and the location information of the APs 104a-104d are sent to the AP 104 for determining the position of the user 502 in the indoor environment.

The AP 104 uses the trilateration approach for determining the position of the user 502. In an embodiment, the AP 104 runs the one or more multipath mitigation algorithms to reduce multipath effects. The AP 104 can use the Bayesian Propagation Model for determining the position of the user 502.

The determined position of the user 502 can be sent to the mobile device 102 through any suitable communication medium such as Bluetooth, Wi-Fi and so on. The mobile device 102 displays the determined position to the user 502.

In an example, when the user is in an indoor environment such as in office or a mall, or in a hospital, where the user 502 wishes to move to a specific location the proposed system and method can be used to determine the position of the mobile device 102 and therefore the position of the user 502. The position of the user can be displayed on the mobile device 102 using an indoor positioning application in the mobile device 102. The user 502 can move to the specified location based on directions displayed on the mobile device 102.

When the user 502 moves from one location to another location, the APs serving the mobile device 102 may change due to the mobility of the user 502 in the indoor environment. In an example, new APs may serve the mobile device 102 based on the location of the mobile device 102 in the indoor environment. Thus, the mobile device 102 obtains the position from the AP 104 based on its location and the APs that are serving mobile device 102 within that location.

Figure 6:
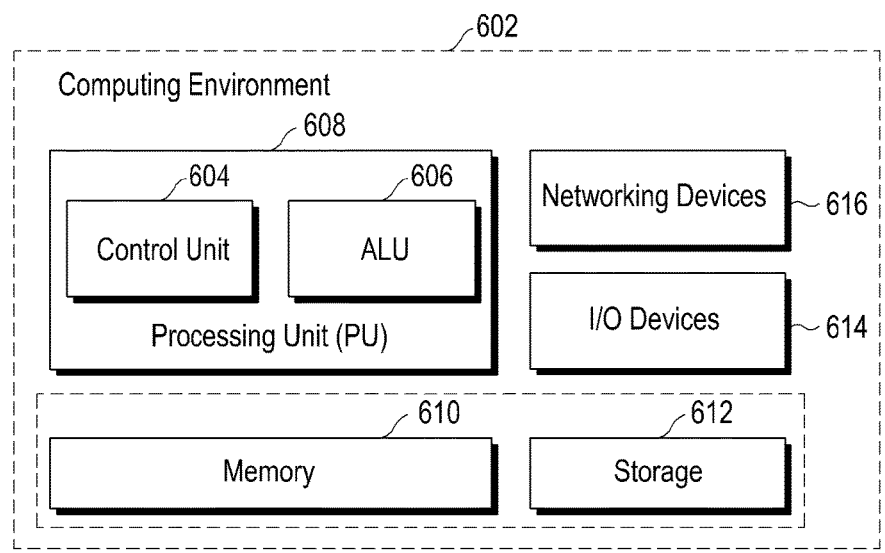
FIG. 6 illustrates a computing environment implementing the method and system for determining the position of the mobile device, according to the embodiments as described herein.

FIG. 6 illustrates a computing environment implementing the method and system for determining the position of the mobile device, according to the embodiments as described herein. As depicted the computing environment 602 comprises at least one processing unit 608 that is equipped with a control unit 604 and an Arithmetic Logic Unit (ALU) 606, a memory 610, a storage unit 612, plurality of networking devices 608 and a plurality Input output (I/O) devices 614. The processing unit 608 is responsible for processing the instructions of the algorithm. The processing unit 608 receives commands from the control unit in order to perform its processing. Further, any logical and arithmetic operations involved in the execution of the instructions are computed with the help of the ALU 606.

The overall computing environment 602 can be composed of multiple homogeneous and/or heterogeneous cores, multiple CPUs of different kinds, special media and other accelerators. The processing unit 608 is responsible for processing the instructions of the algorithm. Further, the plurality of processing units 608 may be located on a single chip or over multiple chips.

The algorithm comprising of instructions and codes required for the implementation are stored in either the memory unit 610 or the storage 612 or both. At the time of execution, the instructions may be fetched from the corresponding memory 610 and/or storage 612, and executed by the processing unit 608.

In case of any hardware implementations various networking devices 616 or external I/O devices 614 may be connected to the computing environment to support the implementation through the networking unit and the I/O device unit.

The embodiments described herein can be implemented through at least one software program running on at least one hardware device and performing network management functions to control the elements. The elements shown in FIGS. 1, 2, 3, 5 and 6 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of determining a position of a mobile device by an Access Point (AP), the method comprising:
    receiving a first signal including a medium access controller (MAC) identifier (ID) of the mobile device from the mobile device, wherein the AP is associated with the mobile device;
    extracting received signal strength indicator (RSSI) information of the first signal received from the mobile device corresponding to the MAC ID;
    computing a first distance between the mobile device and the AP based on the extracted RSSI information of the first signal;
    receiving RSSI information of a second signal extracted by another AP and AP information associated with the other AP, from the other AP, wherein the second signal is transmitted from the mobile device to the other AP;
    computing a second distance between the mobile device and the other AP based on the RSSI information of the second signal and the AP information associated with the other AP, wherein the AP information associated with the other AP comprises identity information and location information associated with the other AP;
    determining a position of the mobile device based on the computed first distance and the computed second distance; and
    sending the determined position to the mobile device by the AP.

2. The method of claim 1, wherein the extracted RSSI information of the first signal is dependent on a distance between the AP and the mobile device, and the RSSI information of the second signal is dependent on a distance between the other AP and the mobile device.

3. The method of claim 1, wherein the determining of the position of the mobile device comprises determining the position of the mobile device based on the computed first distance and the computed second distance using at least one of a multipath mitigation algorithm to reduce a multipath effect or a Bayesian propagation model for determining the position of the mobile device.

4. A Wireless Fidelity (Wi-Fi) Access Point (AP) for determining a position of a mobile device, wherein the AP comprises:
    a transceiver configured to perform communication with the mobile device or a plurality of APs; and
    a processor configured to:
        receive a first signal including a medium access controller (MAC) identifier (ID) of the mobile device from the mobile device through the transceiver, wherein the AP is associated with the mobile device,
        extract received signal strength indicator (RSSI) information of the first signal received from the mobile device corresponding to the MAC ID,
        compute a first distance between the mobile device and the AP based on the extracted RSSI information of the first signal,
        receive RSSI information of a second signal extracted by another AP, and AP information associated with the other AP from the other AP through the transceiver, wherein the second signal is transmitted from the mobile device to the other AP,
        compute a second distance between the mobile device and the other AP based on the RSSI information of the second signal and the AP information associated with the other AP, wherein the AP information associated with the other AP comprises identity information and location information associated with the other AP,
        determine a position of the mobile device based on the computed first distance and the computed second distance, and
        send the determined position to the mobile device through the transceiver.

5. The Wi-Fi AP of claim 4, wherein the extracted RSSI information of the first signal is dependent on a distance between the AP and the mobile device, and the RSSI information of the second signal is dependent on a distance between the other AP and the mobile device.

6. The Wi-Fi AP of claim 4, wherein the processor is further configured to determine the position of the mobile device based on the computed first distance and the computed second distance using at least one of a multipath mitigation algorithm to reduce a multipath effect or a Bayesian propagation model for determining the position of the mobile device.

7. A computer program product comprising computer executable program code recorded on a computer readable non-transitory storage medium, the computer executable program code when executed causing actions including:
    receiving a first signal including a medium access controller (MAC) identifier (ID) of a mobile device from the mobile device through a transceiver, wherein an access point (AP) is associated with the mobile device;
    extracting received signal strength indicator (RSSI) information of the first signal received from the mobile device corresponding to the MAC ID;
    computing a first distance between the mobile device and the AP based on the extracted RSSI information of the first signal;
    receiving RSSI information of a second signal extracted by another AP, and AP information associated with the other AP from the other AP through the transceiver, wherein the second signal is transmitted from the mobile device to the other AP;
    computing a second distance between the mobile device and the other AP based on the RSSI information of the second signal and the AP information associated with the other AP, wherein the AP information associated with the other AP comprises identity information and location information associated with the other AP;
    determining a position of the mobile device based on the computed first distance and the computed second distance; and
    sending the determined position to the mobile device by the AP.

8. The computer program product of claim 7, wherein the extracted RSSI information of the first signal is dependent on a distance between the AP and the mobile device, and the RSSI information of the second signal is dependent on a distance between the other AP and the mobile device.

* * * * *